(12) United States Patent
Uusitalo et al.

(10) Patent No.: US 7,916,002 B2
(45) Date of Patent: Mar. 29, 2011

(54) HAPTIC OPERATIVE USER INTERFACE INPUT APPARATUS

(75) Inventors: Jussi Severi Uusitalo, Hämeenlinna (FI); Kaj Makela, Tampere (FI)

(73) Assignee: Nokia Corporation, Espoo (FI)

( * ) Notice: Subject to any disclaimer, the term of this patent is extended or adjusted under 35 U.S.C. 154(b) by 1306 days.

(21) Appl. No.: 11/478,832

(22) Filed: Jun. 30, 2006

(65) Prior Publication Data

US 2008/0010593 A1  Jan. 10, 2008

(51) Int. Cl.
*H04B 3/36* (2006.01)
(52) U.S. Cl. ............... 340/407.2; 340/965; 340/815.47
(58) Field of Classification Search ........... 340/407.2, 340/825.19, 965, 407.1, 815.4, 815.48, 815.47, 340/815.62, 815.71
See application file for complete search history.

(56) References Cited

U.S. PATENT DOCUMENTS

| | | | |
|---|---|---|---|
| 4,202,615 A | 5/1980 | Nemoto | 354/152 |
| 4,314,750 A | 2/1982 | Orban | 354/198 |
| 4,327,985 A | 5/1982 | Urushihara et al. | 354/289 |
| 5,496,174 A * | 3/1996 | Garner | 434/114 |
| 5,926,119 A | 7/1999 | Lindeman et al. | 341/22 |
| 6,218,966 B1 | 4/2001 | Goodwin et al. | 341/27 |
| 6,636,202 B2 * | 10/2003 | Ishmael et al. | 345/173 |
| 6,667,738 B2 | 12/2003 | Murphy | 345/173 |
| 6,788,294 B2 | 9/2004 | Takala et al. | 345/173 |
| 6,967,642 B2 | 11/2005 | SanGiovanni | 345/156 |
| 7,009,599 B2 * | 3/2006 | Pihlaja | 345/173 |
| 2002/0003469 A1 * | 1/2002 | Gupta | 340/407.1 |
| 2003/0022701 A1 | 1/2003 | Gupta | 455/566 |
| 2007/0152974 A1 | 7/2007 | Kim et al. | 345/168 |

FOREIGN PATENT DOCUMENTS

| | | |
|---|---|---|
| DE | 43 19 795 A1 | 1/1994 |
| GB | 2 306 078 | 4/1997 |
| JP | 2002-024903 | 1/2002 |
| JP | 2004-117950 | 4/2004 |
| JP | 2005-223616 | 8/2005 |
| JP | 2006-003746 | 1/2006 |
| KR | 2003-0048697 | 6/2003 |
| KR | 2006-0027655 | 3/2007 |
| WO | WO 2004/042685 | 5/2004 |
| WO | WO 2004/068521 | 8/2004 |

OTHER PUBLICATIONS

Article entitled "Miniature Piezoelectric Motors for Precision Positioning" from www.NewScaleTech.com regarding squiggle® MOTORS, pp. 1-4, published Oct. 19, 2005.
HTC Touch TouchFLO Navigating the Touch Cube.
HTC Smart Mobility Touch Phone User Manual.

* cited by examiner

*Primary Examiner* — Daniel Previl

(57) ABSTRACT

A haptic/tactile input in which the behavior and/or appearance of the mechanical user interface input is configured to be adapted to the function and context of an electronic device to give feedback and cues to the user. The mechanical input for example, buttons, sliders, levers, and other input devices are made appear on the surface of the user interface when needed.

9 Claims, 4 Drawing Sheets

HAPTIC OPERATIVE USER INTERFACE INPUT APPARATUS

TECHNICAL FIELD

The present invention relates generally to input devices and more specifically with haptic/tactile input devices and more particularly with haptic/tactile user interface input devices for electronic devices.

BACKGROUND OF THE INVENTION

There is a strong demand to create electronic devices that have selectable multiple functions, particularly mobile telephone devices, all of which functions require a user interface typically provided by a haptic/tactile input device including buttons, sliders, levers and touch elements that are permanently present on the user interface surface of the device. The status, availability and function of the device is generally identified visually, e.g. with lights and labels that are controlled by software in the device. The input devices are permanently present on the surface of the user interface and available in all contexts and conditions which leads to user errors and confusion, due to the need to indicate that the function is not available or that a given command (of several available) was executed. Visual identification is not suitable for visually impaired users which affects the accessibility of the device for such users. Hiding or making certain input devices not visible in certain modes by a mechanical change in the device for example, by a slide, hinge or twist or body parts, adds size and cost to the device. From the user's cognitive load and also styling points of view there is a need to make devices as uncluttered as possible

SUMMARY OF THE INVENTION

In accordance with a broad aspect of the invention, a novel concept of a haptic/tactile input device is presented in which the behavior and/or appearance of the mechanical user interface input is configured to be adapted by the software components to the function and context of an electronic device to give feedback and cues to the user. The mechanical input embodying the invention, for example, buttons, sliders, levers, and other input devices are made appear on the surface of the user interface when needed.

In a further aspect, the input is configured to change its behavior based on context, for example: a button is not made available at the user interface surface when the function is not available and is brought up and made available at the user interface surface only when the corresponding function is available; a button cannot be pressed or operated and it is frozen or made rigid for movement when the function is not available; the touching pressure is variable as a button is made more resistive to movement as the value of an associated parameter is high or a limit is approached.

In a further aspect, the topography of the surface or contact surface area of an input such as for example, a given key or button alters its contact surface characteristic in accordance with a given function of an electronic device for providing a haptic/tactile input when the input is active. In essence the surface area of the input is flat or recessed when the input is inactive and bulges out when the input is active. The input surface topology may also be made to change repetitively to guide a user, for example, a user with impaired vision, to attract the user's attention, to direct the user's attention to a certain desired direction on the display screen or on the electronic device. The input device surface topology may also be made to perform a secondary task by providing simulative feedback to a user by controlled rhythmic movement to create user delight and/or to support the notion of a living object.

The electronic device may be configured for example, for operation as a mobile terminal, music player, personal assistant, gaming unit or other such electronic devices and include features and functions such as camera functionality, GPS functionality and other functions and features well know by the purchasing public.

BRIEF DESCRIPTION OF THE DRAWINGS

Additional features and benefits of the user interface input embodying the present invention will become readily apparent from the following description taken in conjunction with the drawings wherein.

WRITTEN DESCRIPTION OF PREFERRED EMBODIMENTS

Figure 1:
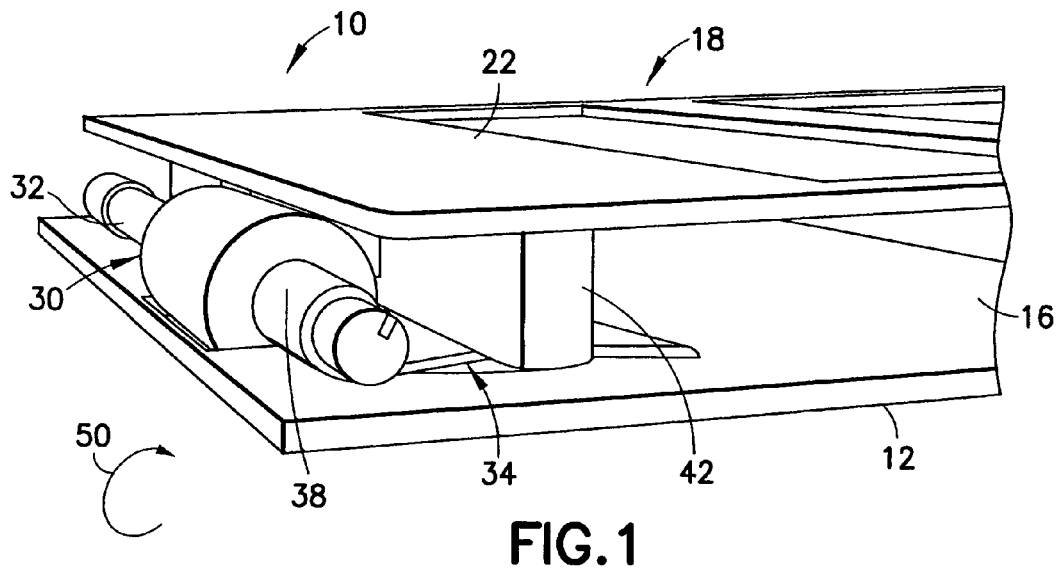
FIG. 1 is a schematic perspective fragmentary view of an input device embodying the present invention shown in an unavailable operative position.
Figure 2:
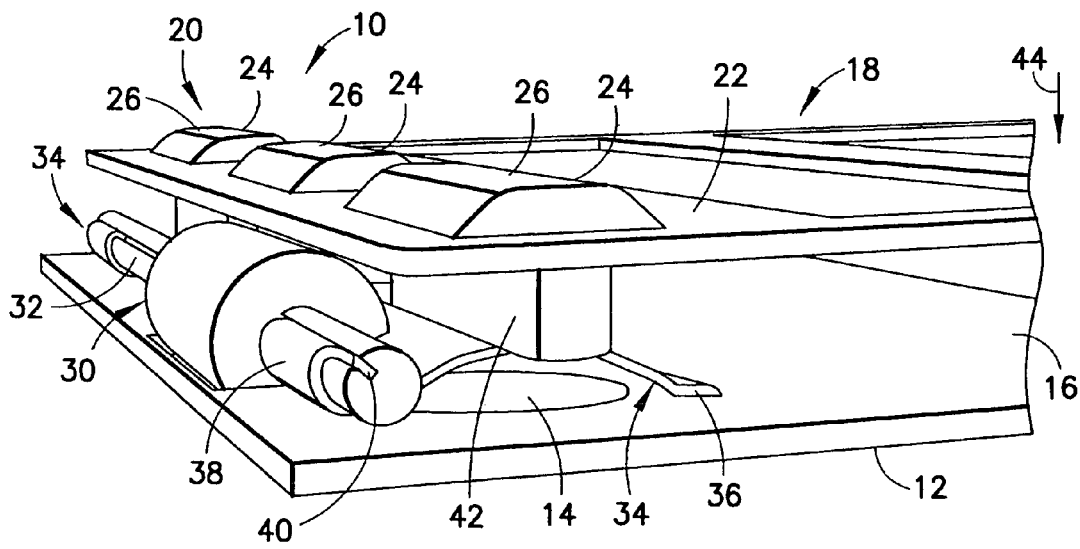
FIG. 2 is a schematic perspective fragmentary view of the input device of FIG. 1 shown in an available operative position.

Turning now to the drawings and considering the invention in further detail, a schematic perspective fragmentary view of an input device embodying the present invention is illustrated in FIGS. 1 and 2 and generally designated at 10, wherein the input device 10 is shown in an unavailable operative position in FIG. 1 and is shown in an available operative position in FIG. 2. In this example, an electronic device, such as a mobile telephone, includes a printed circuit board, generally designated at 12, which carries various electrical components, memory devices, controllers, and other associated components necessary to carry out the intended function of the electric device. For purposes of illustration, the printed circuit board 12 includes a dome switch 14 on the surface 16 of the printed wiring board 12 to complete an electrical circuit path when the dome switch 14 is operated as is well known and understood by those skilled in the art. A user interface or keypad generally designated 18 is appropriately located and carried by the electronic device and is made in this example of an elastomer/rigid two-component plastic part wherein the elastomer portion generally designated 20 is deformable and configured to stretch or bulge above the surface 22 such that the surface topology contact area 24 defines keys 26, 26 when the input device 10 is active or in a first operative state, as illustrated in FIG. 2.

An actuator mechanism, such as for example a piezoelectric motor generally designated 30 is appropriately mounted to the printed circuit board 12 and includes a shaft 32 extending axially lengthwise of the piezoelectric motor 30. A sheet spring steel band generally designated 34 has one end 36 attached to the printed circuit board 12 and its opposite end 38 suitably attached to the shaft 32 of the piezoelectric motor 30, for example by inserting the end 38 into a complementary shaped and sized slot 40 in the shaft 32. The sheet spring steel band 34 is somewhat "C" shaped and is located over the dome switch 14. The sheet spring steel band 34 is in contact with a downward extending foot 42 of the elastomer portion 20 defining the key 24. When the key 24 is pressed or otherwise pushed downward in a direction toward the surface 16 of the printed circuit board 12, as indicated by the direction arrow 44, the bottom 46 of the foot 42 contacts the sheet spring steel band 34 pushing it into contact with the dome switch 14 to operate the switch 14. When the downward pressure is removed from the key 24, the sheet spring steel band 34 returns to its "C" shaped configuration pushing the foot 42 upward to make the key 24 available.

In a situation in which the key 24 is not available, for example when the electric device does not have a given function associated with the key 24 available for the particular mode selected, the surface area topology 26 of the key 24 is flush with the surface 22 of the user interface 18 indicating the key is unavailable. The elastomer portion defining the key 24 is permitted to return to its unstretched state when the shaft 32 of the piezoelectric motor 30 rotates in a clockwise direction as indicated by the rotation arrow 50 such that the end 38 of the sheet spring steel band 34 rotates with the shaft 32, thereby shortening the length of the sheet spring steel band 34, causing the band 34 to flatten and approach the surface 16 of the printed circuit board 12, removing the upward bias on the elastomer foot 42. As shown in the FIGS. 1 and 2, the shaft 32 may accommodate a number of sheet spring steel bands 34, each of which are associated with a key 24, and the number of keys 24 are determined in accordance with the requirements of the electronic device with which the input device 10 of the present invention is used.

A piezoelectric motor which may be utilized with the input device of the present invention is available, for example, from New Scale Technologies, Inc. under the trademark name Squiggle Motor to provide the desired actuation and appearance and disappearance of the keys as described above. The operation of such piezoelectric motors is well understood by those skilled in the art and the reader is referred to the manufacturer's literature which is incorporated herein by reference for a more detailed description of the piezoelectric motor and its operation.

Figure 3:
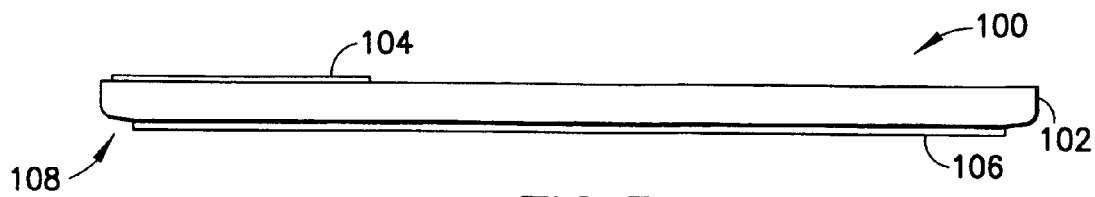
FIG. 3 is a schematic side view of an electronic device embodying the input device of the present invention.
Figure 4:
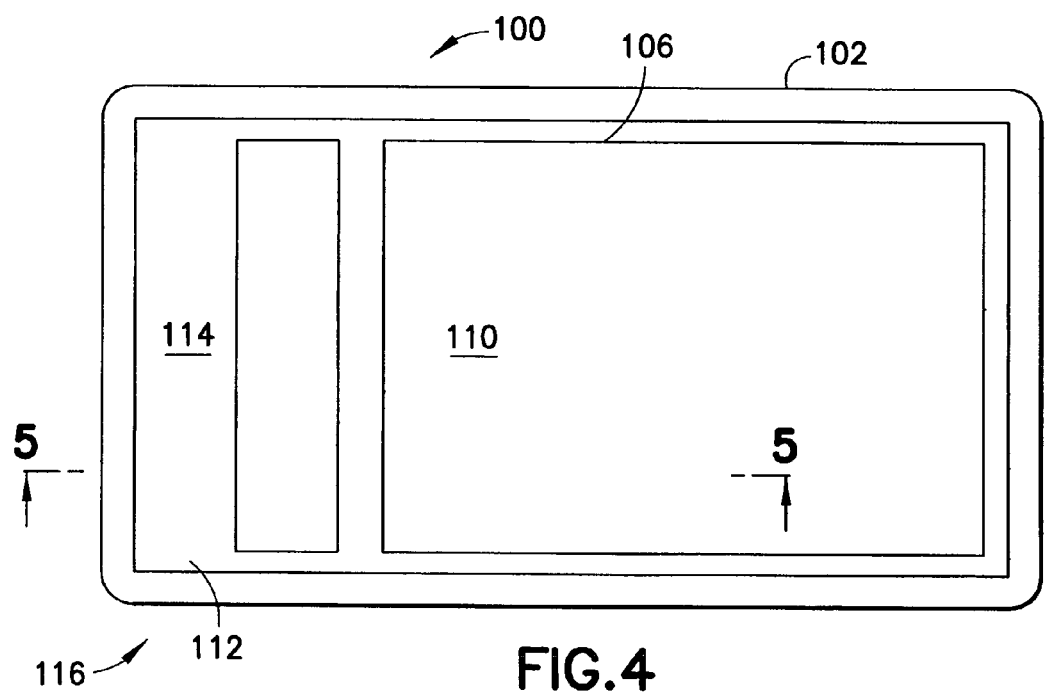
FIG. 4 is a top plan view of the electronic device shown in FIG. 3.
Figure 5:
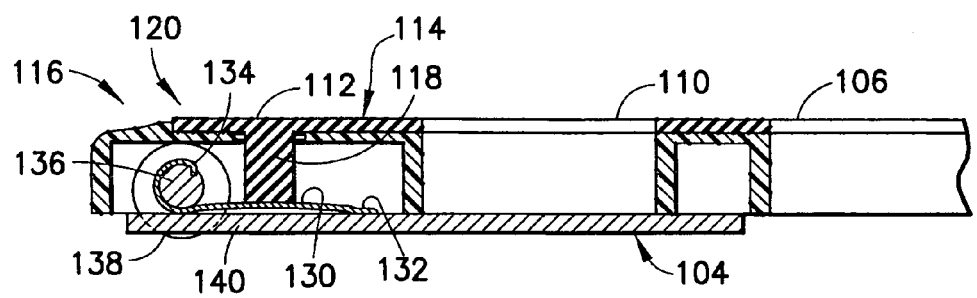
FIG. 5 is a schematic cross-section view taken along the line 5-5 in FIG. 4 showing the input device embodying the present invention in an unavailable operative position.

Turning now to FIGS. 3-8, an electronic device, such as a mobile telephone, embodying the input device of the present invention is illustrated therein and generally designated 100, wherein only the cover portion generally designated 102 of the electronic device 100 is illustrated for purposes of explanation. The electronic device 100 includes a printed circuit board 104 suitably arranged and carried in the cover 102. An elastomer/rigid two-component plastic part keypad generally designated 106 is suitably arranged and carried on an outward facing side 108 of the cover 102. The keypad 106 includes an elastomer portion 112 whose outward facing surface 114 is substantially flush with the surface 110 of the keypad 106. The input device embodying the present invention is generally designated 120 and is located at one end 116 of the electronic device 100 in the region of the elastomeric portion 112 of the keypad 106. The elastomeric portion 112 includes a downwardly extending foot 118 of sufficient length to contact a sheet spring steel band 130 having one end 132 connected to the printed circuit board 104 and an opposite end 134 suitably attached to the shaft 136 of a piezoelectric motor or other suitable actuator generally designated 138 mounted on the printed circuit board 104. The sheet spring steel band 130 is located and arranged over a dome switch 140 carried on the printed circuit board 104 and beneath the foot 118 such that the sheet spring steel band 130 is located between the foot 118 and the dome switch 140. As illustrated in FIGS. 3-5, the keys defined by the elastomer portion 112 are not accessible and available for use.

Figure 6:
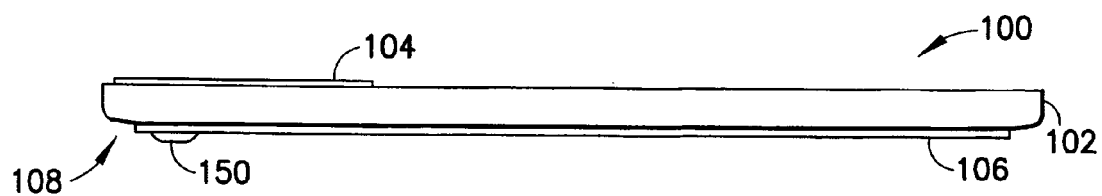
FIG. 6 is a schematic side view of the electronic device presented in FIG. 3 showing the input device of the present invention in an available operative position.
Figure 7:
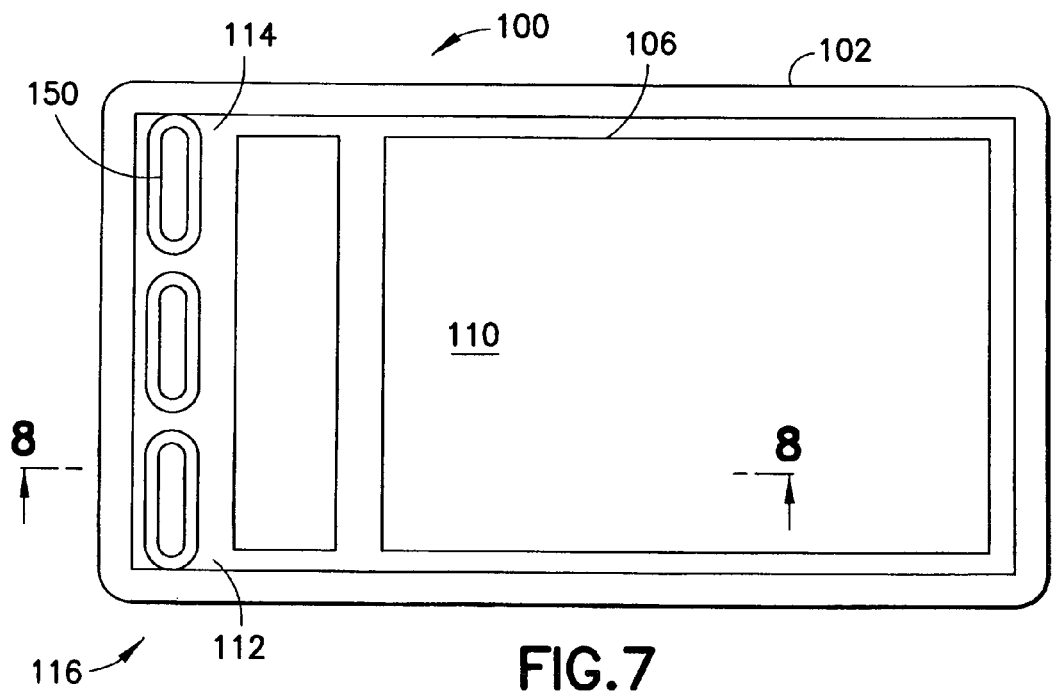
FIG. 7 is a top plan view of the electronic device shown in FIG. 6.
Figure 8:
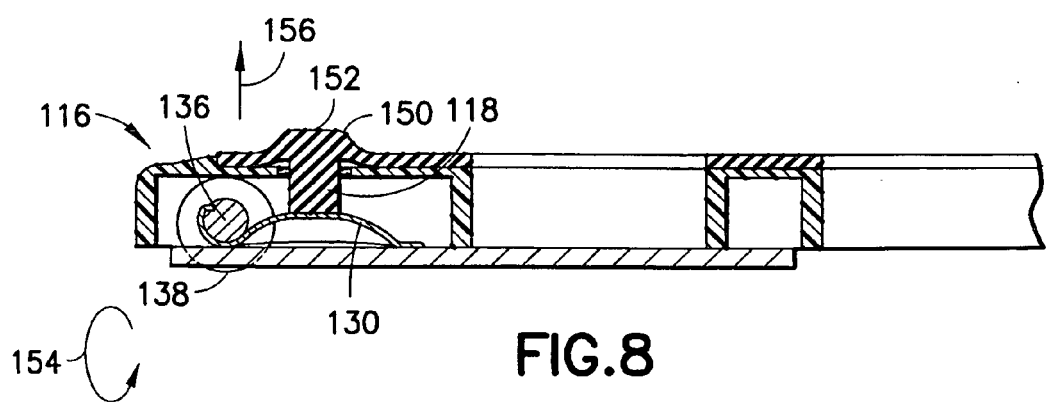
FIG. 8 is a schematic cross-section view taken along the line 8-8 in FIG. 7 showing the input device embodying the present invention in an available operative position.

With reference to FIGS. 6-8, the electronic device 100 illustrated in FIGS. 3-5 is illustrated therein, wherein the haptic/tactile input device embodying the present invention is activated to make a key or button 150 available for access and use by causing the topography of the contact surface area 152 to bulge or project above the surface topography 114 of the user interface or keypad 106. In this situation, the shaft 136 of the piezoelectric motor 138 is caused to rotate in a counter-clockwise direction as indicated by the direction arrow 154 allowing the sheet spring steel band 130 to increase its length allowing it to return to its "C" shaped state, thereby pushing the foot 118 of the elastomer portion 112 upward in the direction indicated by arrow 156 to cause the key 150 to be formed in the surface 114 of the elastomer portion 112 of the user interface.

Figure 9:
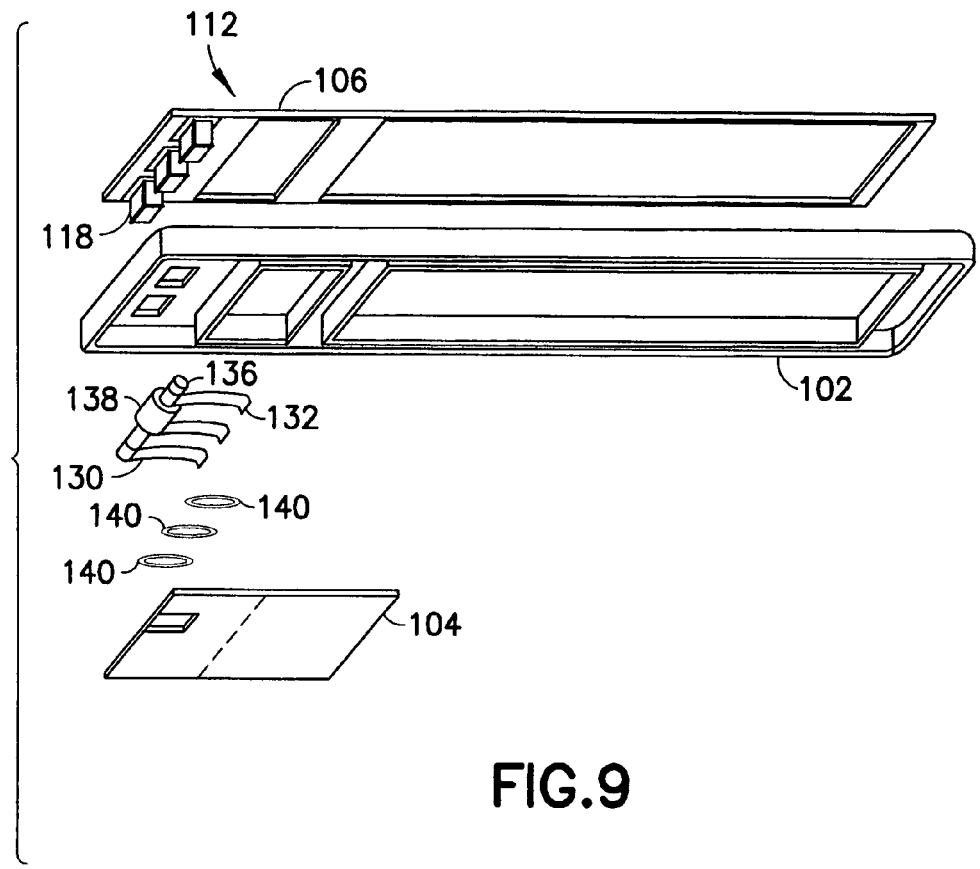
FIG. 9 is an exploded schematic view of an embodiment of the input device of the present invention as viewed from the underside of an electronic device with which the input device may be used.
Figure 10:
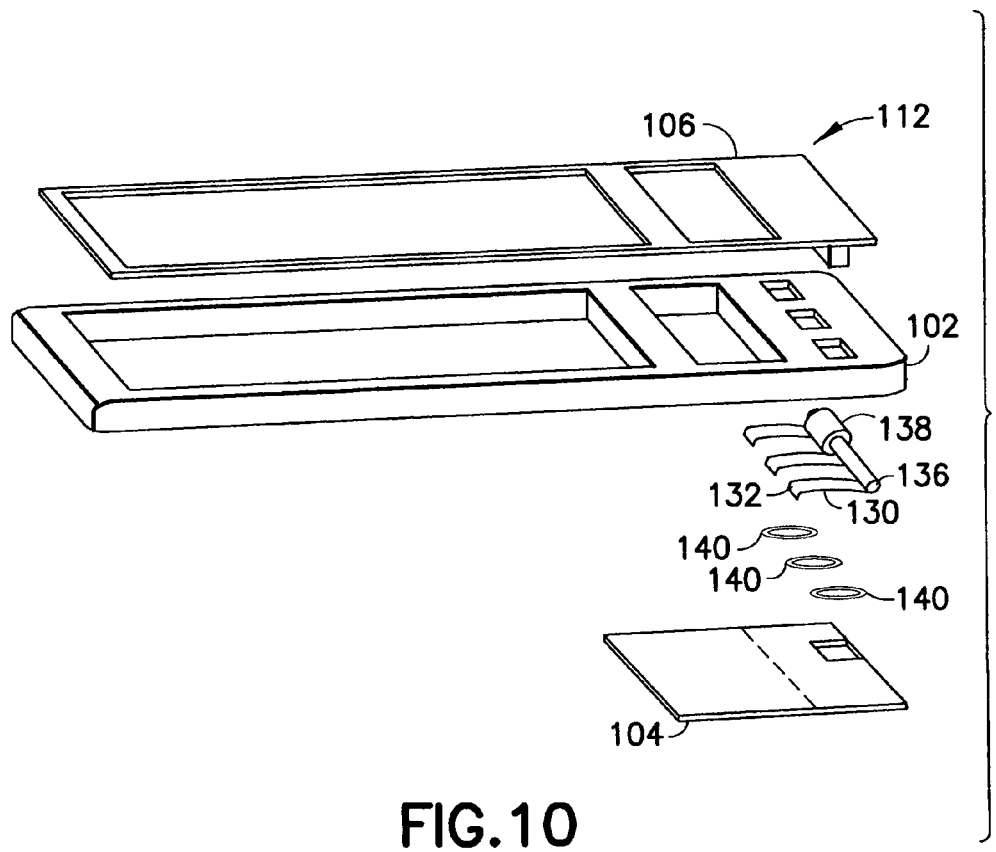
FIG. 10 is an exploded schematic view of an embodiment of the input device of the present invention as viewed from the upperside of an electronic device with which the input device may be used.

Turning now to FIGS. 9 and 10, an exploded schematic view of the electronic device 100 illustrated in FIGS. 3-8 is shown therein as viewed from the underside in FIG. 9 and as viewed from the upperside in FIG. 10, wherein like reference numerals correspond to like parts. As shown, the elastomer portion 112 of the keypad 106 may be molded or shaped to accommodate the requirements of the particular electronic device as defined by the aperture in the cover 102 to align with the sheet spring steel bands 130 and dome switches 140. It should also be recognized that the dome switches 140 are not necessary, and the electrical contact may be created by the sheet spring steel band 130 to complete the electrical circuit connection that is made by the dome switch.

It should also be recognized that the keypad 106 may be made as a single molded unit with a rigid portion and an elastomer portion or there may be a rigid plunger in contact with the sheet spring steel band to push down on the band and dome switch.

It should also be recognized that the foot 118 formed in the elastomer portion 112 of the keypad 118 may be connected to the sheet spring steel band 130 to make a recessed key in the surface topology of the keypad 106.

The following describes several examples of usage of the haptic/tactile input device embodying the present invention for purposes of providing a fuller understanding of the invention.

Example 1

In this example, the mobile telephone is in the phone or communication mode and the user interface surface is flat. When the mobile telephone is switched into the camera mode, the camera trigger button appears on the surface of the user interface. If the camera function is available in the mobile telephone, but something needs to be done before the picture can be taken, the button can be locked temporally into an upward state to indicate that a picture cannot be taken until the item requiring attention is corrected or attended to. For example, the pressing force on the camera trigger button can be altered or increased to provide a warning that the memory for pictures is low requiring more pressing force to on the button to take a picture. The increased pressing force required indicates that attention should be paid to the status of the memory.

Example 2

In this example, the mobile telephone is in the phone or communication mode and the user interface surface topology is flat. When the mobile telephone is switched into media player mode, the media player buttons corresponding to available functions, for example, play/next/prev., appear and obtrude on the user interface surface topology. If a user is on the first track, there is no prev. button available. The function availability may also be accented by switching on a backlight for this button contact surface area.

Example 3

In this example, the mobile telephone device is in the phone or communication idle mode and the user interface surface topology is flat. When the mobile telephone receives an incoming call, the answering button appears on the user interface surface. Because the answer function requires the user's immediate attention, the button can be made to indicate the urgency by moving partially to capture user's tactile or visual attention. The user answers the call by pressing the button and the button then disappears from the user interface surface, and another button for ending the call appears on the user interface surface.

In the examples described above, it will be recognized that the appearance of a button on the user interface surface indicates the availability of the associated function and since the button is only present when the function is available it avoids that the user would press this button accidentally in a situation where he/she is not intending to operate the button. Furthermore, the mechanical obtrusion of buttons is avoided and does not present an obstacle when inserting or sliding the mobile telephone device into a pocket.

It should be recognized by those skilled in the art that there are other mechanisms and methods that may be employed to alter the surface area topology for providing the haptic/tactile input embodying the invention. For example, an array of particles, which can be controlled with electricity, magnetics or temperature to change the particle movement, flexibility or other feature may be sandwiched between the substrate surface a flexible material coating. The arrays form the input devices, for example, buttons, sliders etc., which are visible and haptically detectable. The adaptation may be achieved by multiple technologies.

In one example, the polarity of a magnetic field between certain parts within the input device may be changed such that the parts to repel to create a topological hill, i.e active key, or to attract one another to flatten the bump, i.e to make the key inactive.

In another example, adaptation may be made directly to the material forming the dome of a regular keypad to alter the topology of the surface of the dome.

In a further example, bimetals may be used by following a thermometer principle to bulge or protrude the key by making a bimetal part to straighten and curl depending on a temperature change created by and initiated by a device lead to the bimetal causing the surface topology to change accordingly.

In a further example, a thermoactive liquid is suitably embedded in the substrate material to alter the surface topology by warming the substance to turn it from solid to a liquid and vice versa which changes the volume of the liquid.

It will be recognized and appreciated that in all the implementations described above, the extent or amount of the bulging and resistivity to pressure from a user's finger may be adaptable to accommodate and achieve a desired operating characteristic.

The invention claimed is:

1. A method, comprising:
    using a substrate surface topology altering mechanism to selectively impart a force on at least one defined contact surface area in a deformable portion of a substrate of an electronic device to alter a surface topology of the substrate at the at least one defined contact surface area in accordance with a given function of the electronic device; and
    providing, in response to said force selectively imparted from said substrate surface topology altering mechanism, a haptic operative input for which selective portions of the at least one defined contact surface area protrude from the deformable portion of the substrate;
    wherein the electronic device has a plurality of pre-determined input modes and the given function is dependent on which one of the plurality of pre-determined input modes is currently active.

2. The method as defined in claim 1 wherein said substrate surface topology is flush with a surface of said substrate for indicating an unavailable operative input state and protrudes from said surface of said substrate for indicating an available operative input state.

3. The method as defined in claim 2 wherein said substrate surface topology altering mechanism is further configured with an actuation mechanism in co-operative engagement with said contact surface area for protruding said contact surface area from a substrate surface for haptic recognition of the presence of an input and for retracting said contact surface area from said substrate surface for haptic recognition of the absence of said input.

4. The method as defined in claim 1 wherein said surface of said substrate is made of a suitable elastomer material.

5. The method as defined in claim 1 further comprising a plurality of inputs, a first number of which are selectively enabled in accordance with a first operative mode of the plurality of pre-determined input modes of said electronic device and another number of which are selectively enabled in accordance with a second given operative mode of the plurality of pre-determined input modes of said electronic device.

6. The method as defined in claim 1 wherein said substrate surface topology altering mechanism is further configured for providing a variable pressure haptic operative input such that a higher pressing force corresponds to an alert to respond to a condition of said given function of said input.

7. Apparatus, comprising:
    a surface topology altering mechanism for selectively changing a surface topology of a substrate of an apparatus having at least one defined contact surface area in a deformable portion of said substrate to alter the surface topology of the substrate at the at least one defined contact surface area in accordance with a given function of the apparatus; and
    a haptic operative input for which selective portions of the at least one defined contact surface area protrude from the surface topology of said substrate in response to said surface topology altering mechanism;

wherein the apparatus has a plurality of pre-determined input modes and the given function is dependent on which one of the plurality of pre-determined input modes is currently active.

8. The apparatus as defined in claim 7, wherein the contact surface area comprises a plurality of inputs, a first number of which are selectively enabled in accordance with a first operative mode of the plurality of pre-determined input modes of said apparatus and a second number of which are selectively enabled in accordance with a second operative mode of the plurality of pre-determined input modes of said apparatus.

9. The apparatus as defined in claim 7 wherein said contact surface area is further configured for providing a variable pressure haptic operative input such that a higher pressing force corresponds to an alert to respond to a condition of said given function of said input.

* * * * *